US009027581B2

(12) United States Patent
Butler

(10) Patent No.: US 9,027,581 B2
(45) Date of Patent: May 12, 2015

(54) PNEUMATIC CONTROLLED SLAM SHUT VALVE

(75) Inventor: David C. Butler, Ogden, UT (US)

(73) Assignee: Dresser, Inc., Addison, TX (US)

( * ) Notice: Subject to any disclaimer, the term of this patent is extended or adjusted under 35 U.S.C. 154(b) by 1019 days.

(21) Appl. No.: 13/089,655

(22) Filed: Apr. 19, 2011

(65) Prior Publication Data

US 2011/0259434 A1    Oct. 27, 2011

Related U.S. Application Data

(60) Provisional application No. 61/328,542, filed on Apr. 27, 2010.

(51) Int. Cl.
| | |
|---|---|
| *F17D 3/00* | (2006.01) |
| *F16K 31/16* | (2006.01) |
| *F16K 31/00* | (2006.01) |
| *G05D 16/06* | (2006.01) |
| *G05D 16/16* | (2006.01) |

(52) U.S. Cl.
CPC .............. *F16K 31/16* (2013.01); *F16K 31/003* (2013.01); *G05D 16/0675* (2013.01); *G05D 16/163* (2013.01)

(58) Field of Classification Search
CPC ..... F16K 15/033; F16K 15/035; F16K 17/00; F16K 17/10; F16K 17/164; G05D 16/163
USPC ........... 137/458, 463, 465, 464, 14, 456, 559; 251/74
See application file for complete search history.

(56) References Cited

U.S. PATENT DOCUMENTS

| | | | |
|---|---|---|---|
| 807,725 | A | 12/1905 | Crawford |
| 1,805,702 | A | 5/1931 | Mastenbrook |
| 2,327,055 | A | 8/1943 | McMahon |
| 2,366,246 | A | 1/1945 | Erbguth |
| 2,638,928 | A | 5/1953 | Stadler |
| 3,422,841 | A * | 1/1969 | Sydney .......................... 137/461 |
| 3,635,239 | A | 1/1972 | Farrer |
| 2009/0260697 | A1 | 10/2009 | Mevius et al. |

FOREIGN PATENT DOCUMENTS

| | | |
|---|---|---|
| CN | 201013918 Y | 1/2008 |
| GB | 2297605 A | 8/1996 |
| WO | 2006108770 A2 | 10/2006 |

OTHER PUBLICATIONS

PCT Search Report and Written Opinion issued Apr. 15, 2014 in connection with corresponding PCT Patent Application No. PCT/US2011/033235.
Fisher Controls International, Inc., "Type OSE Slam-Shut Valve", Bulletin 71.6:OSE, published 1997, 12 pages.
Emerson Process Management, Fisher Controls International, "Type OS2 Slam Shut Device", Instruction Manual Form 5668, published Mar. 2001, 20 pages.
Emerson Process Managemnet, "BM5 series Slam shut vales", published at least as early as Apr. 26, 2010, 12 pages.
U.S. Appl. No. 13/082,941, filed Apr. 8, 2011, titled "Controlling Fluid Flow".
Unofficial English translation of CN Office Action dated Jan. 13, 2014 from corresponding Application No. 201180021517.3.

* cited by examiner

*Primary Examiner* — Kevin Lee
*Assistant Examiner* — P. Macade Nichols
(74) *Attorney, Agent, or Firm* — Paul Frank + Collins PC

(57) ABSTRACT

Systems and methods provide pneumatic control of a slam shut valve system.

18 Claims, 13 Drawing Sheets

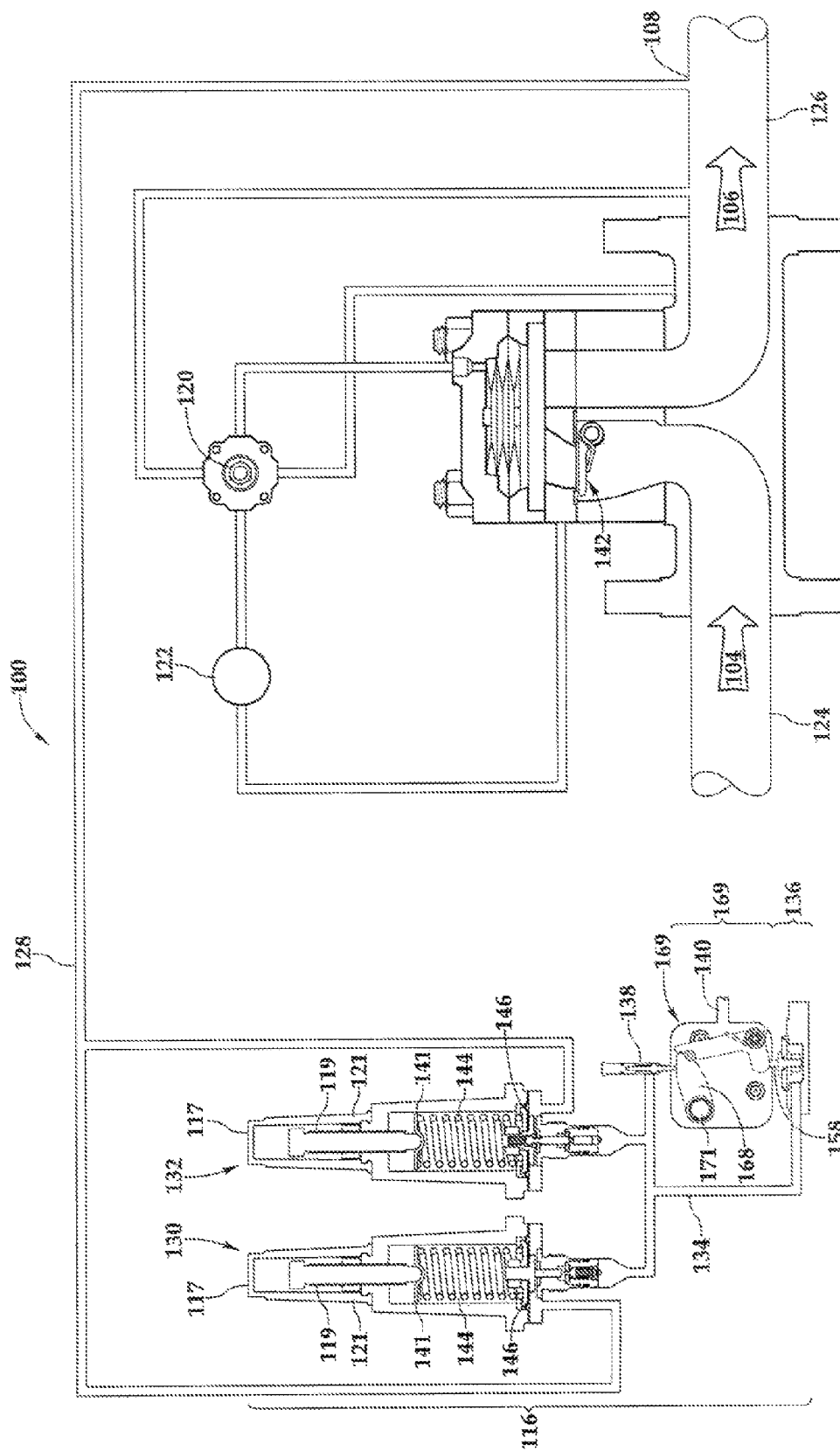

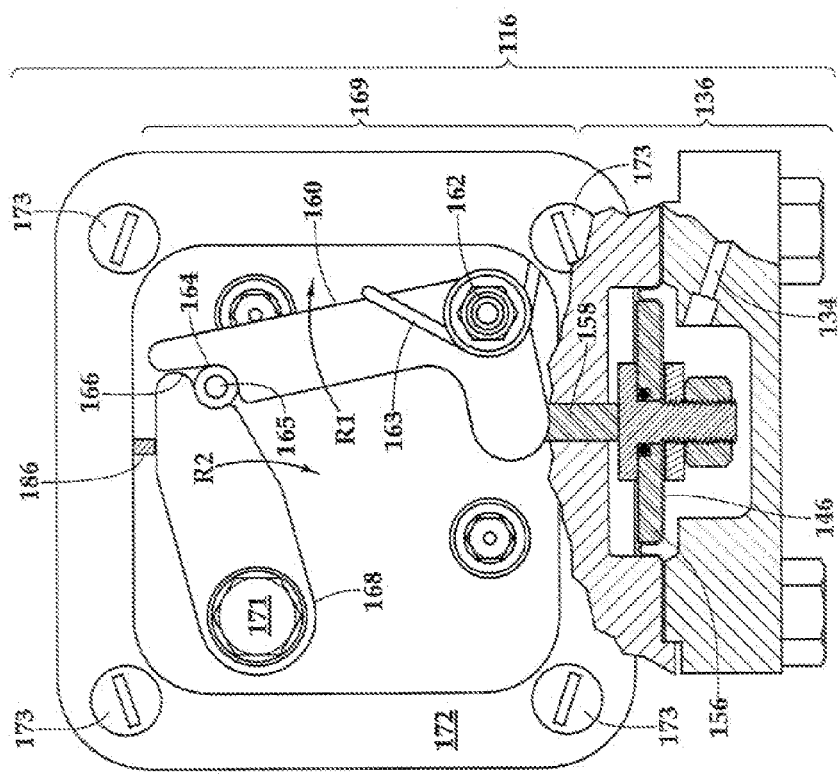
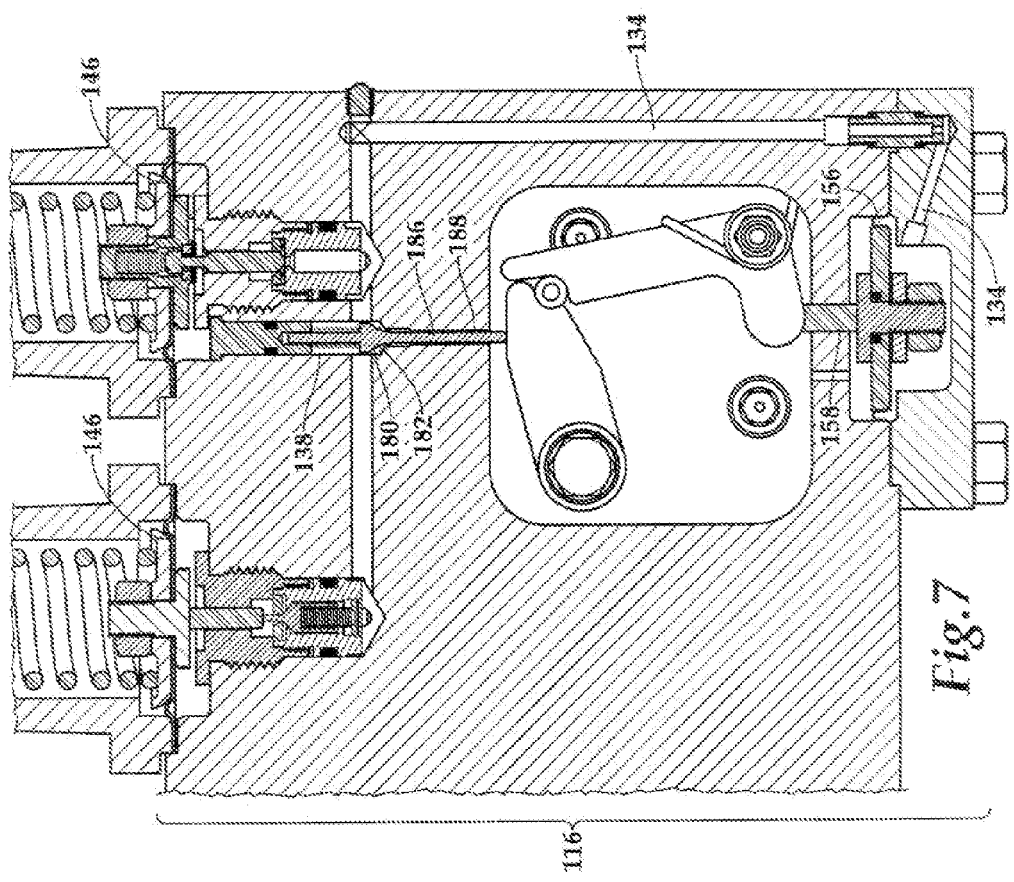

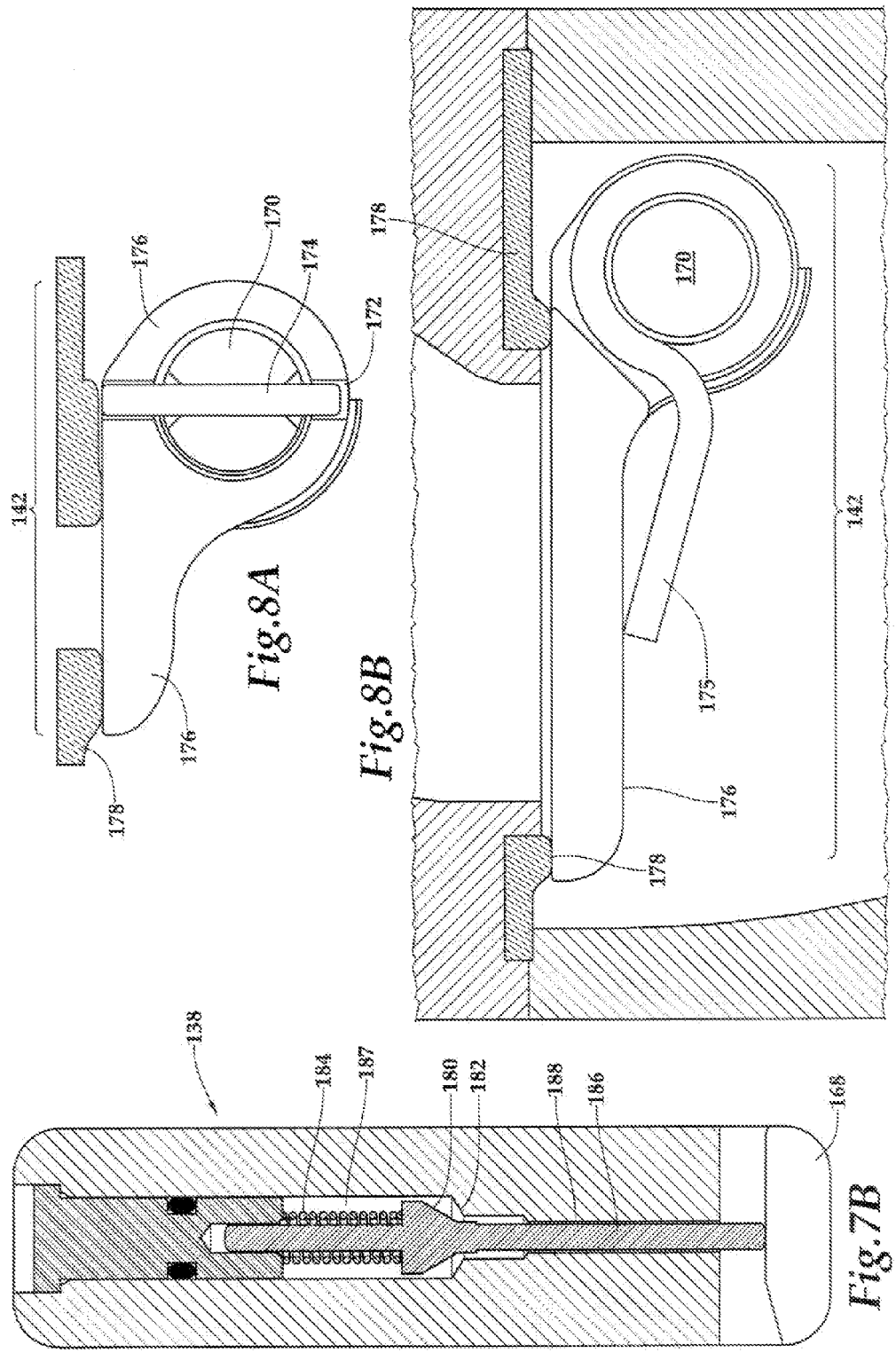

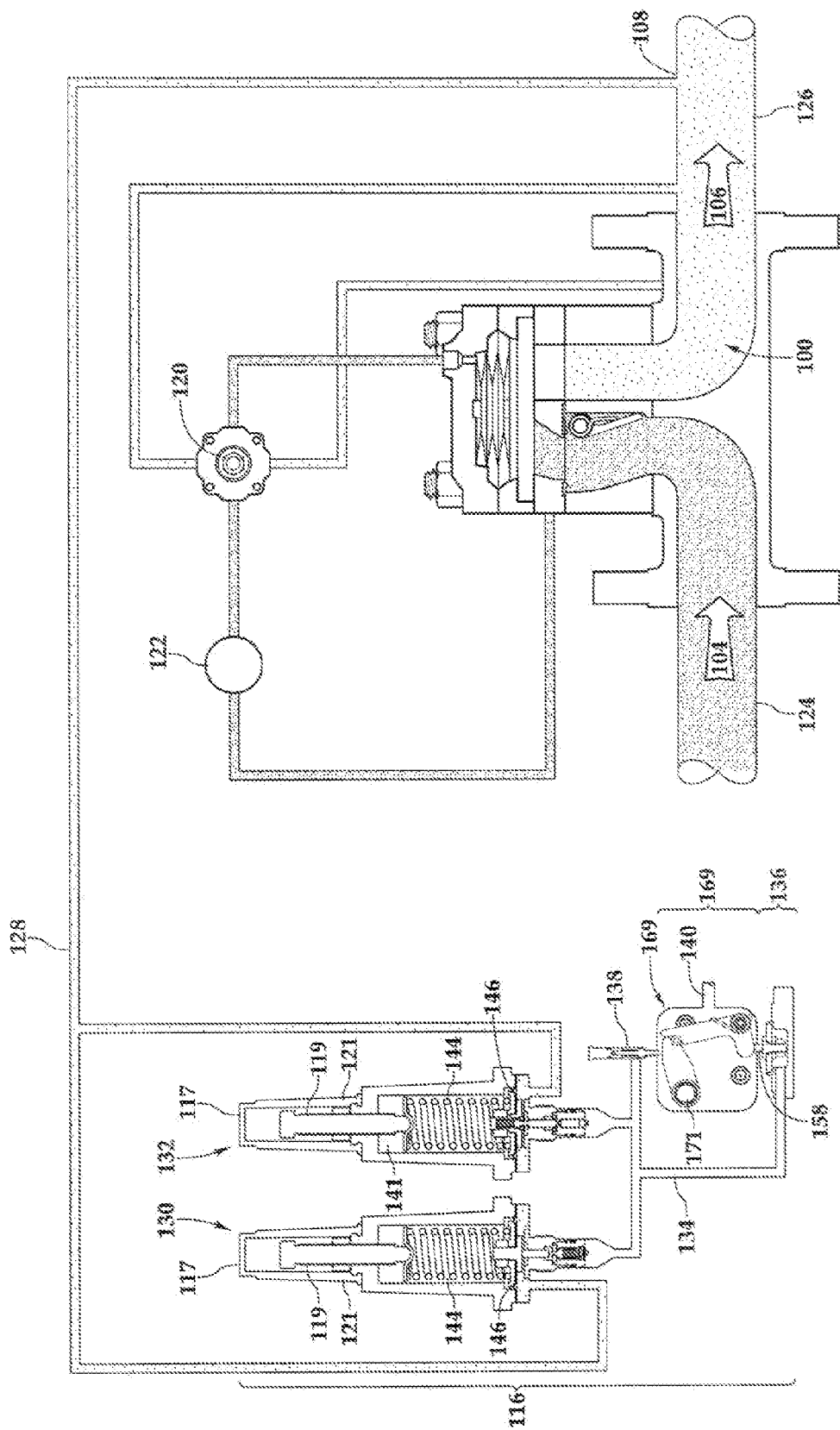

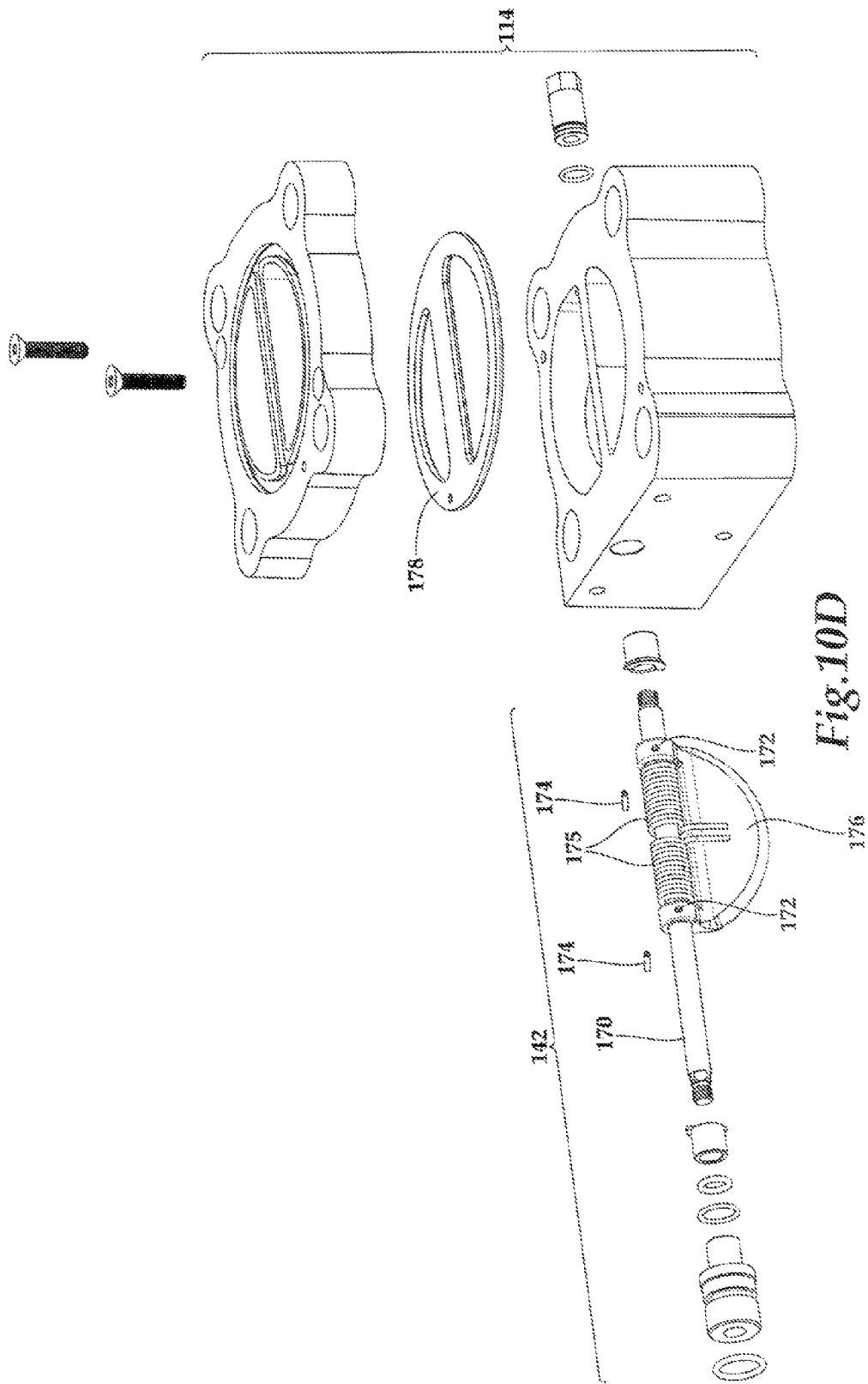

PNEUMATIC CONTROLLED SLAM SHUT VALVE

CROSS-REFERENCE TO RELATED APPLICATION

This application claims priority under 35 USC §119(e) to U.S. Provisional Patent Application No. 61/328,542, filed on Apr. 27, 2010, and entitled "Pneumatic Controlled Slam Shut Valve," the contents of which are fully incorporated herein by reference.

TECHNICAL FIELD

This disclosure relates to pneumatically controlled valves.

BACKGROUND

Pressure regulation stations are used to control the pressure in gas distribution systems. Most modern day gas distribution systems require multiple layers of protection to prevent the pipeline downstream of a regulation station from being over pressurized and potentially failing. National, international and local codes, statutes, laws and operational practices govern the requirements of a particular installation. Slam shut valves are used in natural gas systems to provide an additional layer of protection by shutting off the flow of gas. In many areas of the world, slam shuts are required by statute or law.

Each layer of protection adds to the cost of installation and operation of a distribution system. While the cost of purchasing and installing added equipment is intuitive, the larger operational cost is more complex. Each layer of pressure protection must be allocated a pressure range in which it operates. This range is between the maximum pressure the pipeline is rated for and its normal operation pressure. The width of the pressure range is a function of the equipment's accuracy. The impact of a lower pipeline operating pressure is a lower flow rate of gas in the distribution system.

Slam shut valves can be designed for use with a pressure reducing regulator to provide secondary downstream pressure protection. Such valves can be designed to shut off the flow of gas when the sense or outlet pressure in the system either exceeds or drops below set point pressures. Historically, slam shut valves typically include: a pressure sensing element that directly operates a latch holding the slam shut valve open; and a spring actuated closing element which may be a plug or flapper that closes against a seat. A typical prior art slam shut valve is included as FIG. 1. Accuracy and repeatable performance are significantly affected by differing designs and types of latching mechanisms. Disadvantages of the prior art include the valve closing at too low or high of a pressure due to vibration, valve leaks, variations in trip pressure due to wear and contamination requiring a maintenance crew to be dispatched. The cost of ownership is increased by the inventory of multiple springs and diaphragms are necessary to vary the set pressures.

SUMMARY

Valves as described in this disclosure can be used to shut off the flow of fluids (e.g., gases) when the sense or outlet pressure in a system either exceeds or drops below set point pressures. These valves can provide both over-pressure and under-pressure shutoff capabilities. Set points are adjustable and repeatable across wide ranges of flow rates, inlet pressures, and temperatures.

In one aspect, a pneumatic controlled slam shut valve system includes: a slam shut valve having an inlet and outlet and an internal closure element disposed there between; a mechanical linkage system having a distal end of a pawl lever contacting a flapper lever attached to the valve closure element; an actuator assembly including an actuator diaphragm and an actuator pin, said actuator pin contacting a proximal end of the mechanical linkage system, said actuator assembly further including a diaphragm operable to receive a pneumatic pressure signal on a first side and move the actuator pin connected to the diaphragm; at least one trip control valve operable to receive a sensed pressure downstream of the slam shut valve; at least one trip control valve operable to output a pneumatic pressure signal from a discharge port; a conduit system connected to the discharge port of the at least one trip control valve and operable to transmit the pneumatic pressure signal to the inlet of the actuator assembly to be applied to the diaphragm therein; a vent valve connected to the conduit, said vent valve having a movable pin with a distal end contacting the flapper lever when the internal closure element is in an open position, wherein contact between the flapper lever and movable pin holds the vent valve in an open position releasing the pneumatic pressure in the conduit system between the trip control valve and the actuator assembly. Embodiments can include one or more of the following features.

In some embodiments, systems also include a reset protrusion disposed on a distal end of a flapper shaft connected to the flapper lever.

In some embodiments, the mechanical linkage system further includes: a latch closing spring that biases a pawl lever from an open position to a closed position when the mechanical linkage is actuated by movement of the actuator pin contacting the proximal end of the mechanical linkage system.

In some embodiments, systems are configured such that when the internal closure element is in a closed position, the vent valve is in a closed position holding the pneumatic pressure in the conduit system between the trip control valve and the actuator assembly. In some cases, the vent valve comprises a resilient member which biases the vent valve towards a closed position.

In some embodiments, the movable pin and the vent valve housing define a small annular region which provides a ring shaped orifice through which minor fluid leakage can pass out the vent valve. In some cases, the small annular region of the vent valve is sized such that the flow of fluid between the controller housing and movable pin is less than the flow of fluid through the trip control valve when open.

In some aspects, methods for pneumatic control of a slam shut valve include: sensing a pressure downstream of a slam shut valve; transmitting the sensed pressure to a trip control valve; outputting a pneumatic pressure signal from the trip control valve to the actuator diaphragm of an actuator assembly moving an actuator pin connected to a diaphragm of the valve controller and moving a proximal end of a mechanical linkage with the actuator pin; and transmitting movement of the proximal end of the linkage system via the mechanical linkage to a distal end of the mechanical linkage thereby: initiating movement of a closure element of the slam shut valve from an open valve position to a closed valve position; and releasing a vent valve to move to its closed position. Embodiments can include one or more of the following features.

In some embodiments, movement of the closure element of the slam shut valve from an open valve position to a closed valve position comprises rotation of the closure element about the axis of a shaft. In some cases, methods also include axially moving the closure element along a pin extending radially from the shaft.

In some embodiments, methods also include, when the closure member is open, releasing a pressure fluid through the vent valve from a conduit extending between the trip control valve to the actuator diaphragm.

In some aspects, methods for resetting a pneumatic controlled slam shut valve include: rotating a flapper shaft: to move an internal closure element of a slam shut valve from a shut position to an open position; and to move a flapper attached to the flapper shaft into contact with the movable pin of a vent valve connected to a conduit system between a trip control valve and a valve controller; opening the vent valve through contact of the flapper attached to the flapper shaft into contact with the movable pin; and releasing pressure from the conduit system between the trip control valve and an actuator assembly. Embodiments can include one or more of the following features.

In some embodiments, releasing pneumatic pressure in the conduit system comprises equalizing pneumatic pressure on opposite sides of the diaphragm of the valve controller. In some cases, equalizing pneumatic pressure on opposite sides of the diaphragm of the valve controller allows a resilient member to move a mechanical linkage member into contact with the flapper lever.

Other mechanisms can be used to provide the functionality of individual parts of the control systems. For example, the actuation movement provided by the mechanical linkage system and lever system could be accomplished by other types of devices including, for example, linear slides, pistons and bellows.

Embodiments can provide one or more of the following advantages.

Valves as described in this disclosure can be reliable. Moving mechanical parts are well contained and resistant to negative effects from vibration. This can provide reduced levels of vibration-induced nuisance trips relative to slam shut valves operated by sensing elements.

Valves as described in this disclosure can be configured to provide for full shutoff without pressure differential requirements (e.g., do not require a difference between the inlet and sense pressure to operate).

Valves as described in this disclosure can be easy to maintain and adjust. The valves can be resistant to sticking due to freezing water or debris in a pipeline because the closing element is not located in the bottom of the pipeline where water and debris accumulate. By changing a single part, the spring, these valves can provide excellent performance and accuracy across a large pressure range. Moreover, the valve can be reset in a single operation after pressure equalizing without removing any caps or covers. The combination of components in one package increases system simplicity.

Some of the advantages of the unique configuration of the pneumatic system and the invention include: system trip pressure is not sensitive to inlet pressure since a vent valve open during normal operation configuration allows the bottom of the trip valves to be at ambient pressure. The vent valve, actuated by the flapper lever, closes and prevents the flow of downstream gas to the atmosphere after a trip incident. The vent valve also automatically bleeds off the actuator pressure during reset operation.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a schematic of the pneumatic control system of FIG. 3.

FIG. 7 is a partial cutaway side view of a pneumatic actuator and latch and a partial side view of the under-pressure and over-pressure trip control valves of FIGS. 5 and 6.

FIG. 7A is an enlarged partial cutaway side view of the pneumatic actuator and latch mechanism of FIG. 7.

FIG. 7B is a partial cross-sectional view of a vent valve of FIG. 7.

FIG. 8A is a partial cross-sectional view of a slam shut flapper valve.

FIG. 8B is a partial cross-sectional view of a slam shut flapper valve.

FIGS. 9A-9C are schematics illustrating the operation of the slam shut valve and regulator of FIG. 3.

FIGS. 10A-10D are exploded perspectives of the slam shut valve and regulator of FIG. 3.

Like reference symbols in the various drawings indicate like elements.

DETAILED DESCRIPTION

Figure 1:
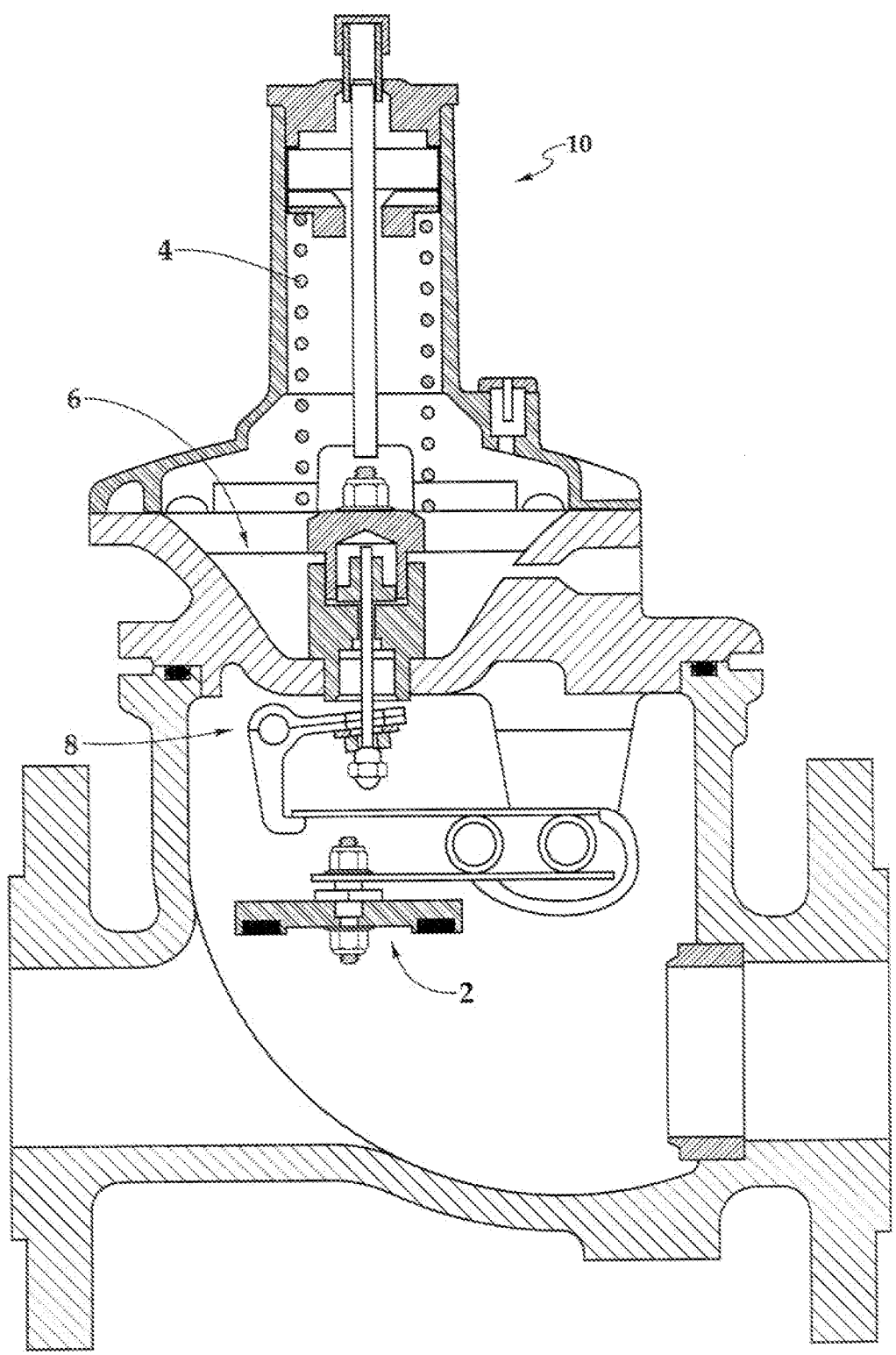
FIG. 1 is a cross-section view of a prior art slam shut valve.

Referring to FIG. 1, there is illustrated a cross-section of a prior art slam shut valve 10. The valve 10 includes a spring 4; a diaphragm 6; latching mechanism 8; and a flapper closure member 2.

Figure 2:
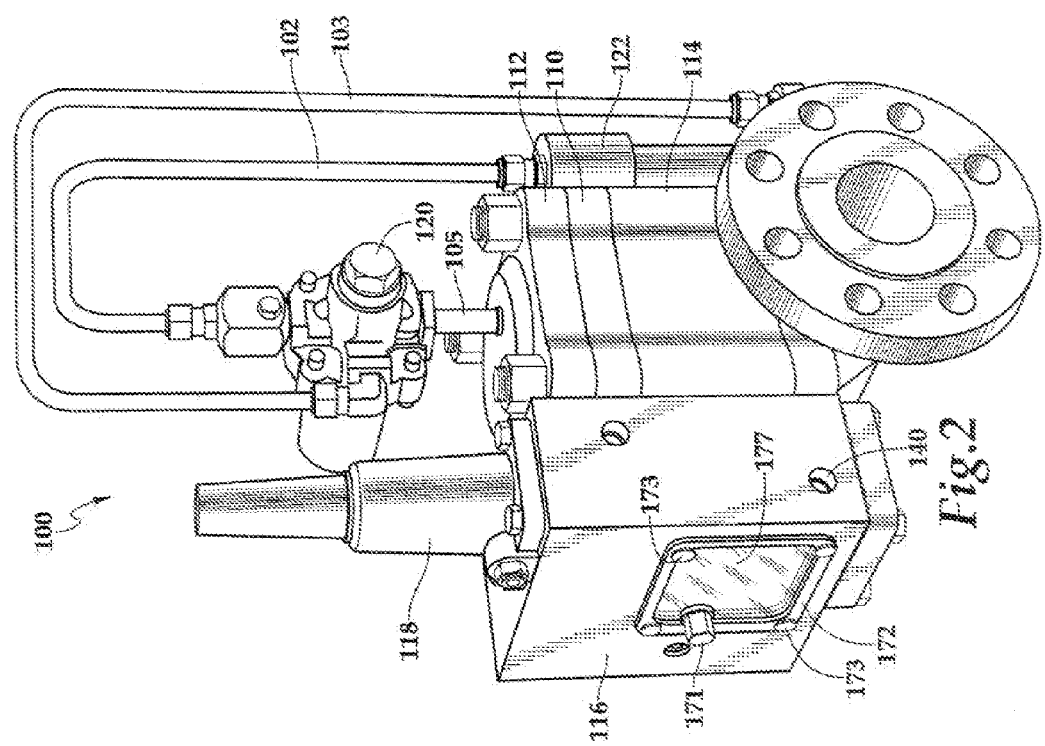
FIG. 2 is a perspective view of a single function slam shut valve and regulator of the present disclosure.

Referring to FIG. 2, there is illustrated a perspective view of a single function combined regulator-slam shut valve system 100 including a regulator 110, a cover 112, a valve module 114, and controller module 116. The controller module 116 is mounted on the side of the valve module 114. The system 100 illustrated in FIG. 2 is configured with a single function controller to provide either over-pressure shut off protection or under-pressure shut off protection.

As illustrated in FIG. 2, fluid conduits 102, 103, 105 connect a pilot module 120 with the regulator 110 and fluid upstream and downstream of the combined regulator-valve system 100. A filter 122 is provided on one of these conduits. The pilot and filter modules are an accessory for the regulator portion of the combined system and is not required for operation of the slam shut valve portion of the system.

Figure 3:
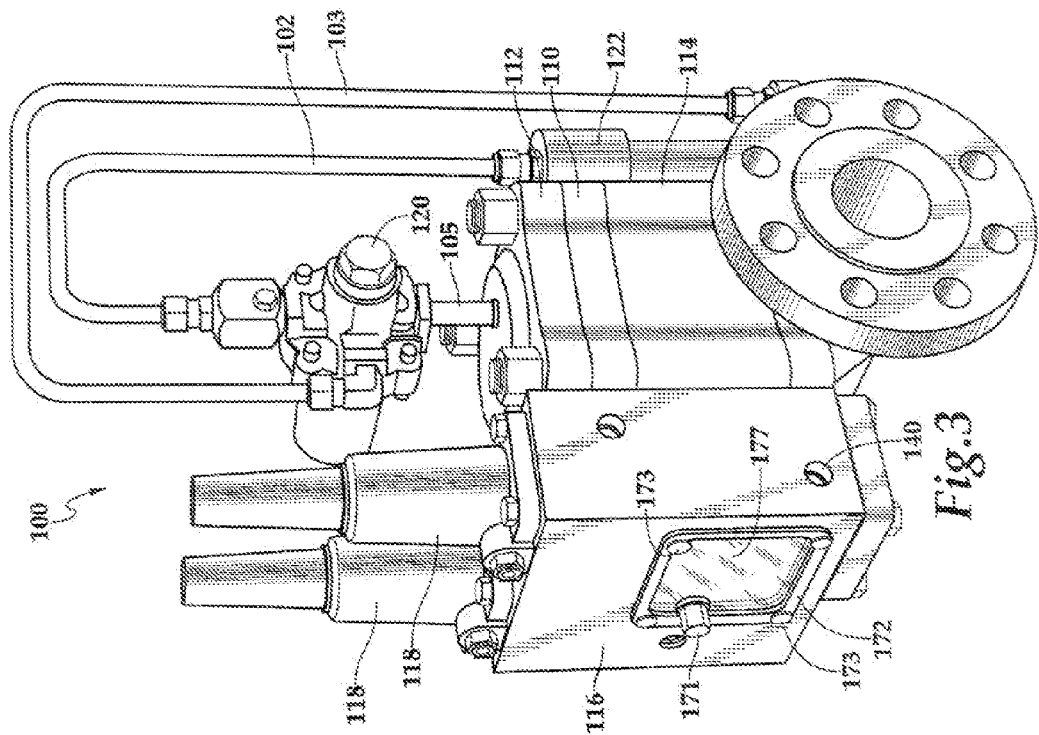
FIG. 3 is a perspective view of a dual function slam shut valve and regulator of the present disclosure.

FIG. 3 illustrates a perspective view of a dual function combined regulator-slam shut valve system 100 that is configured with a dual function controller providing both over-pressure shut off protection and under-pressure shut off protection with both functions being controlled by a common sense port 108 (see FIG. 4). In some embodiments, combined regulator-valve systems 100 can be configured with dual function controllers providing both over-pressure shut off protection and/or under-pressure shut off protection with each function being controlled by an independent sense port. This approach allows monitoring of two independent locations for an over-pressure or under-pressure condition, each with its own set point. This requires two main springs 144 each mounted in a spring case 118.

In some embodiments, as illustrated in FIG. 2 and FIG. 3 and exploded views 10A to 10D, a stand-alone valve can include a body with the valve module 114 and cover 112 mounted on top of the valve module 114 without an associated regulator 110. The controller module 116 mounts on the side of the valve module 114.

FIG. 4 illustrates the pneumatic control system of a combined regulator-slam shut valve system 100 with a dual function controller module providing both over-pressure shut off protection and under-pressure shut off protection with both functions being controlled by a common sensing port 108 monitoring pressure downstream of the combined regulator-slam shut valve system 100 or, alternatively, individual sensing ports. In this example, high pressure natural gas 104 is delivered to the combined regulator-slam shut valve system 100 through inlet piping 124. The combined regulator-slam shut valve system 100 provides natural gas at lower pressures 106 through outlet piping 126. Such valves may be used in pressure control stations used in industrial, commercial and domestic gas distribution systems.

Gas pressure in the outlet piping 126 is monitored at sense port 108. A slam shut valve sense conduit 128 provides fluid communication between the outlet piping 126 and an under-pressure trip control valve 130 and an over-pressure trip control valve 132. The under-pressure trip control valve 130 and the over-pressure trip control valve 132 are discussed in more detail below. As used herein "fluid" includes gas, liquid or a combination of phases. In most embodiments, the fluid operating the pneumatic elements of the present invention will be the same gaseous fluid as is flowing through inlet and outlet piping 124, 126 (e.g., natural gas).

Figure 10A:
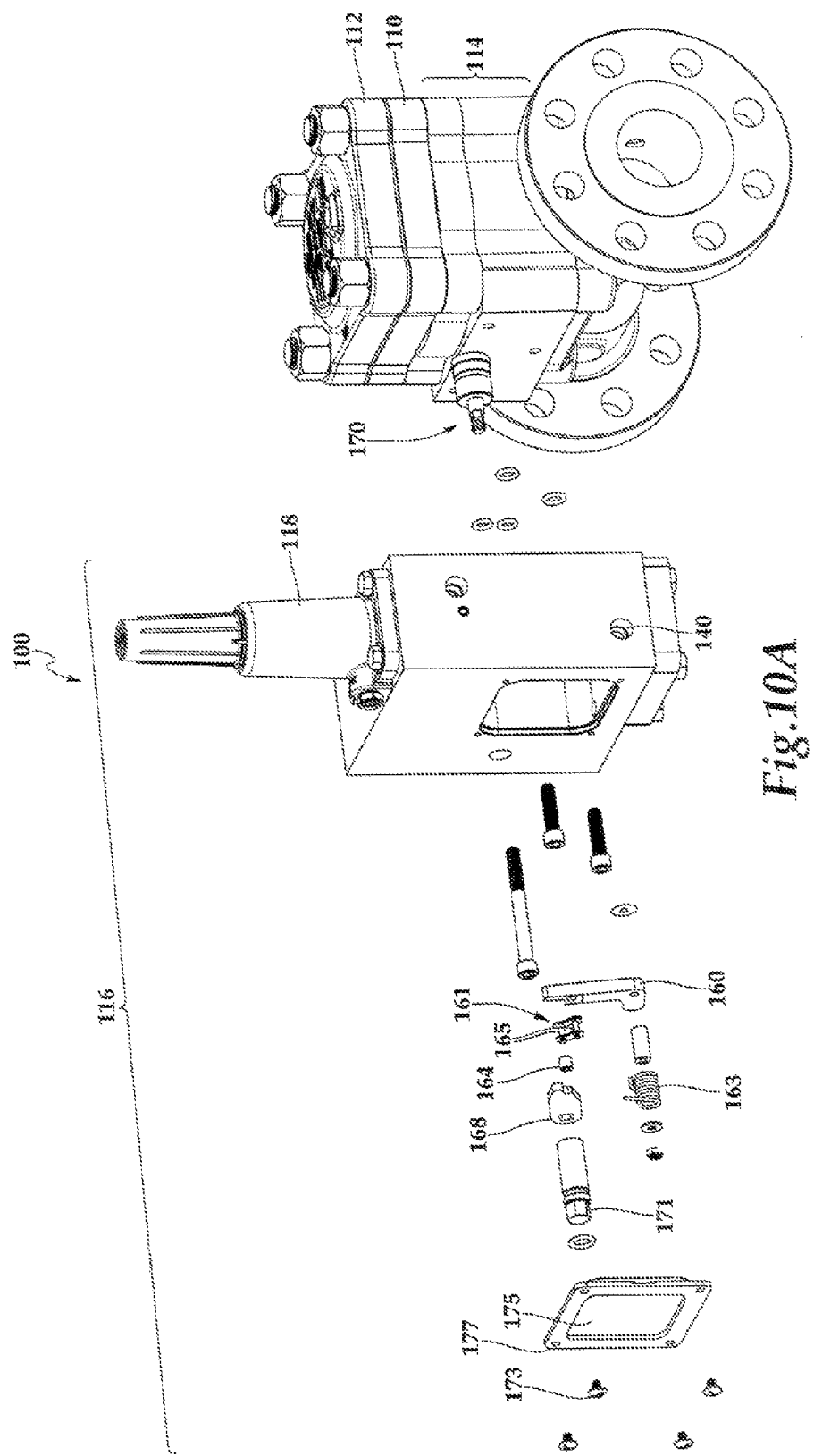

An actuator control conduit 134 provides fluid communication between the outlets of the under-pressure trip control valve 130 and the over-pressure trip control valve 132 and an actuator 136 and a vent valve 138. Fluid applied to the actuator 136 is exhausted from the system through a vent valve 138 and vent 140 when flapper lever 168 (see FIG. 8A) is rotated into the latched position. Although illustrated in FIG. 4 as offset, the flapper lever 168 and flapper valve assembly 142 are aligned and physically connected by shaft 170 (see FIGS. 10A and 10C).

Figure 5:
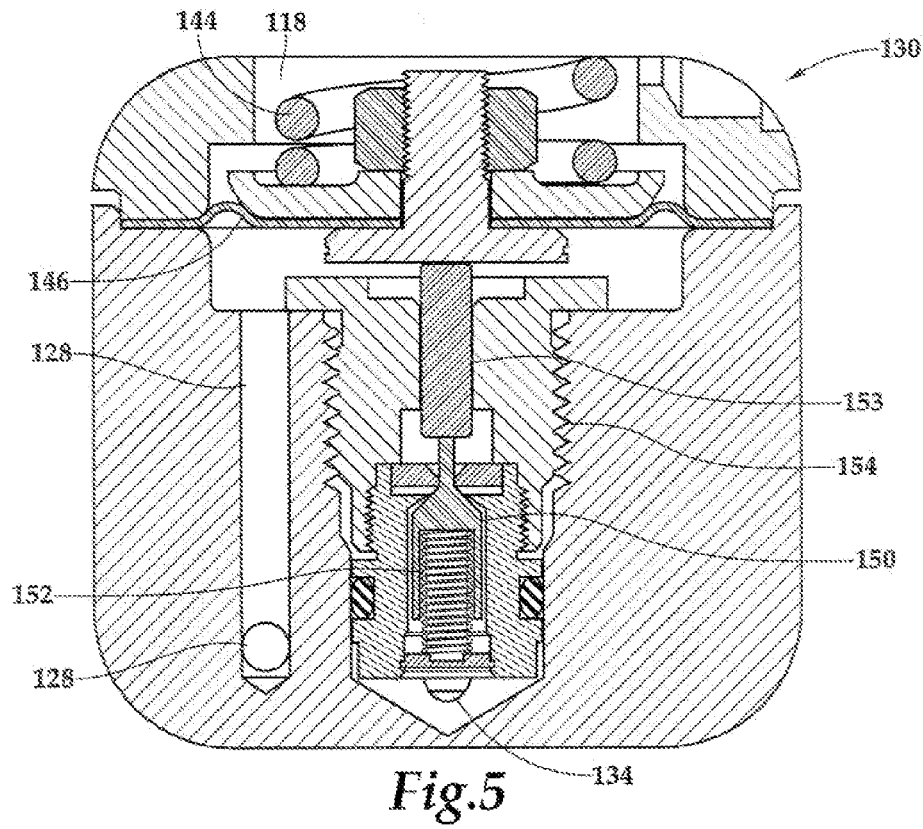
FIG. 5 is a partial cutaway side view of an under-pressure trip control valve.
Figure 10B:
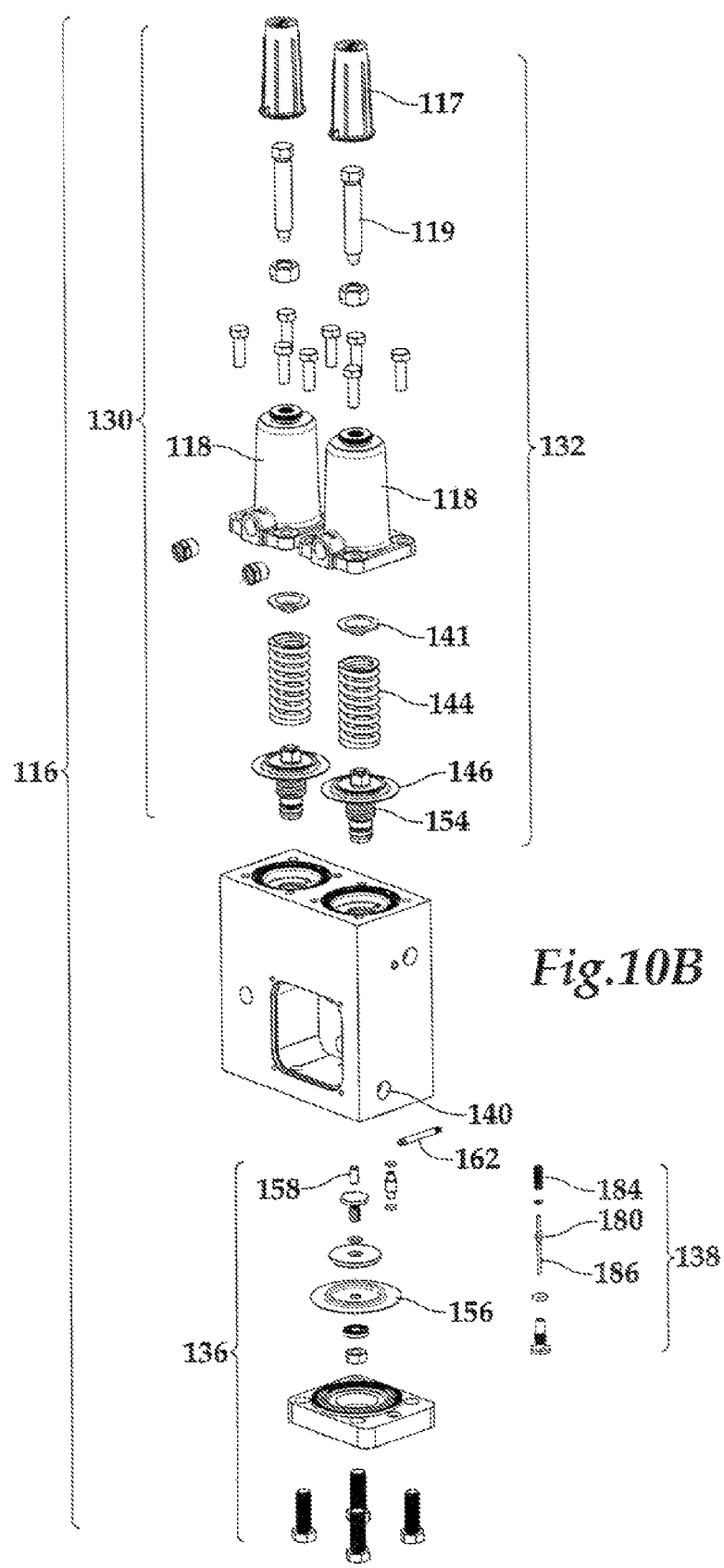
Figure 10C:
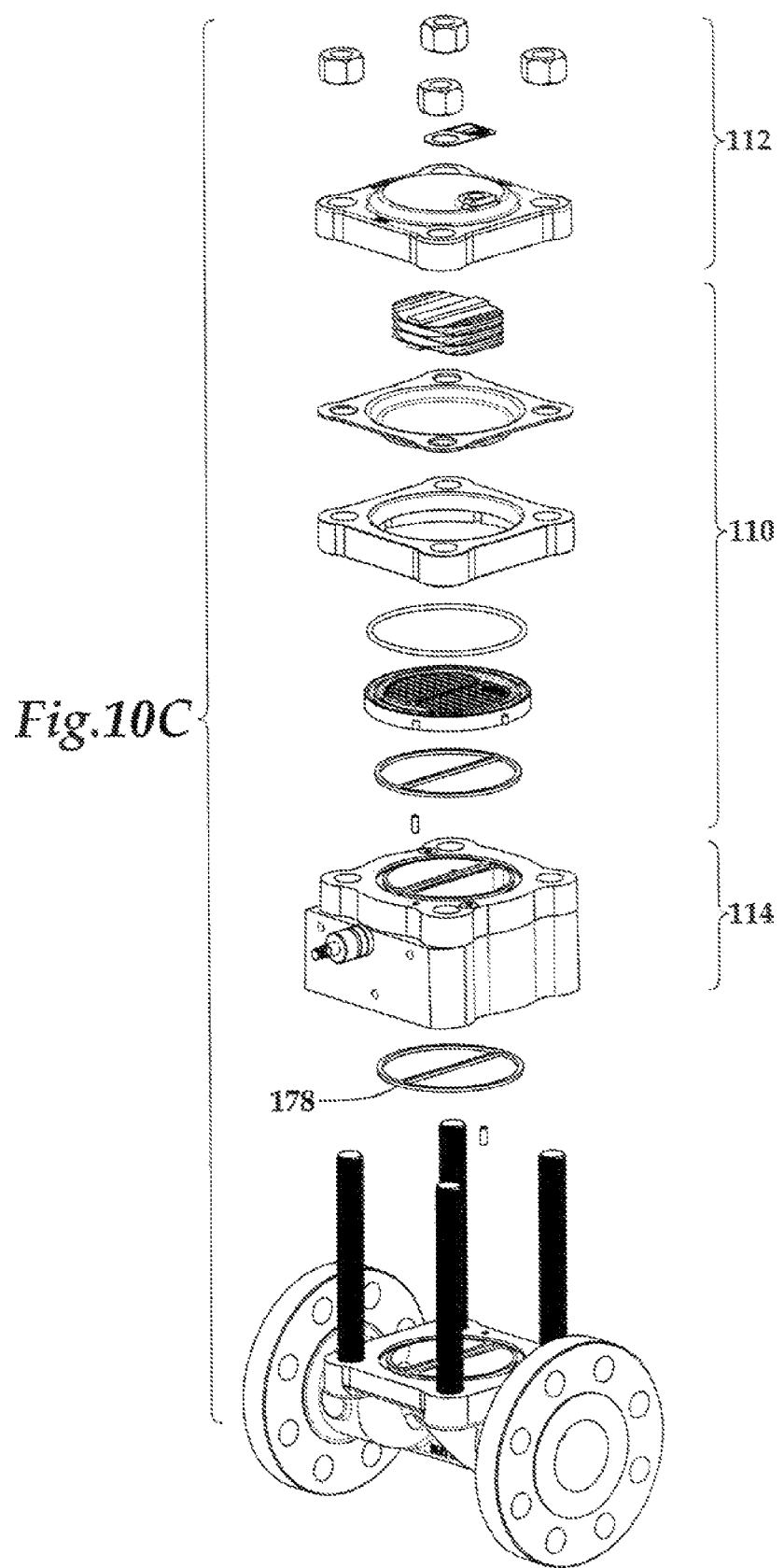

Referring to FIGS. 4, 5, and 10B, the under-pressure trip control valve 130 includes a main spring 144, housed in spring case 118, which engages a diaphragm assembly 146. Conduit 148 provides a fluid connection between the slam shut valve conduit 128 and the diaphragm assembly 146. A pin 153 is guided by guide 154 and mechanically connects the diaphragm assembly 146 with a poppet assembly which includes a poppet 150 and a poppet return spring 152. When the fluid pressure delivered from sense port 108 via conduit 128 to the diaphragm assembly 146 of the under-pressure trip control valve 130 drops below the set point determined by the main spring 144, the under-pressure trip control valve 130 is actuated and supplies fluid pressure to the actuator control conduit 134.

It will be understood that the set pressure in control valves 130 and 132 may be adjusted by removing the upper cover 117 of spring case 118 and rotating adjustment rod 119 which is threadably received in spring case 118 thereby raising or lowering adjusting rod 119 mechanically connected to spring follower 141 to compress or decompress spring 144.

Figure 6:
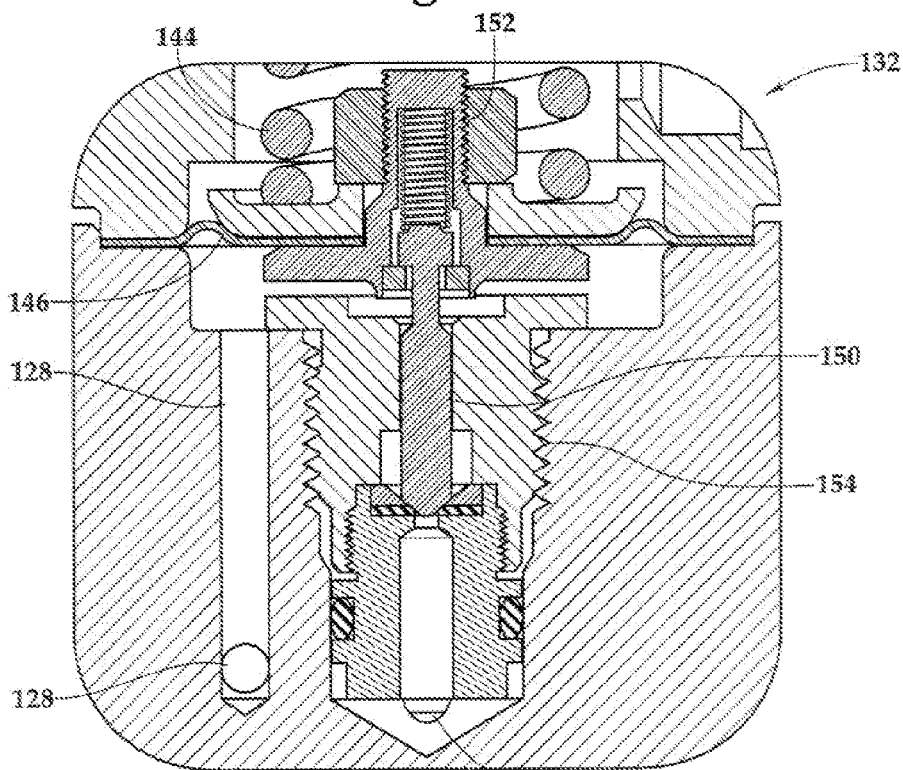
FIG. 6 is a partial cutaway side view of an over-pressure trip control valve.

Referring to FIG. 4 and FIG. 6, the over-pressure trip control valve 132 includes substantially the same components as the under-pressure trip control valve 130. The position of the poppet return valve and application of fluid pressure from the valve sense conduit 128 is reversed relative the under-pressure trip control valve 130. When the fluid pressure delivered by the valve sense conduit 128 via conduit 148 to the diaphragm assembly 146 of the over-pressure trip control valve 130 rises above the set point determined by the main spring 144, the over-pressure trip control valve 130 is actuated and supplies fluid pressure to the actuator control conduit 134.

Referring to FIGS. 4, 7, 7A, 7B, 10A, 10B, 10C, and 10D, the actuator control conduit 134 provides fluid communication between the outlets of the under-pressure trip control valve 130 and the over-pressure trip control valve 132, vent valve 138 (FIG. 7B), and the actuator assembly 136. Minor fluid leakage through trip control valves 130 and 132 can occur during normal operation of the system, particularly as trip control valve set points are approached. Such minor fluid leakage passes out vent valve 138 preventing the buildup of pressure against the actuator 136 and reducing the likelihood of false trips of the slam shut valve. Fluid pressure communicated from the trip control valves 130, 132 is applied to a diaphragm assembly 156 in the actuator assembly 136 via a fluid path 134. The diaphragm assembly 156 includes an actuator pin 158 which engages an L-shaped pawl lever 160 of latch mechanism 169. As illustrated in FIG. 10A, an exploded perspective view, the latch mechanism 169 includes the pawl lever 160 pivotably mounted on pin 162 (see FIG. 10B). A latch closing spring 163 biases the pawl lever into engagement with a flapper lever 168. A roller 164 disposed between the pawl lever 160 and the flapper lever 168 acts as a bearing, thereby reducing friction between the pawl lever 160 and the flapper lever 168 during actuation of the slam shut valve system. The roller is retained in place by a master link 161 which has a first pin 165 extending through the roller 164 and a second pin 165 extending through the pawl lever 160. In some embodiments the master link is similar to a master link in a bicycle chain. The master link includes the two pins 165 swaged into a top plate. On the bottom of the link is a bottom plate that slides on the pins. A spring keeper retains the second flat plate. As illustrated in FIG. 10A, when assembled, the roller 164 fits on the first pin 165. The second pin 165 is loosely retained in an opening in the pawl lever 160. The clearance between the pin 165 and the opening is predetermined such that the roller can move freely on the pawl lever. The surface the roller moves on is a radius with its center coincident with the pivot hole 160. This results in an almost frictionless device.

As shown in FIGS. 7, 7A, and 10A and 10D, the flapper lever 168 engages a shaft 170 of the flapper valve such that the flapper lever 168 holds the flapper valve open until movement of the pawl lever 160 to the right (see rotational arrow $R_1$) which permits downward rotation $R_2$ of the flapper lever 168. The flapper valve shaft 170 includes hex fitting 171 that is disposed out of the housing (see FIGS. 2 and 3) and that can be used to reset the flapper valve 142 and flapper lever 168 to their open positions after actuation of the system. As illustrated in FIGS. 2, 3 and 7A, the controller module 116 includes a window 172 and window frame 177 held in place by screws 173. The window 172 provides visual access to latch mechanism 169. In some embodiments the window and window frame may be formed as a unitary part from a machined sheet of polycarbonate or other suitable material.

FIGS. 8A, 8B and 10D illustrate the flapper valve 142. The shaft 170 of the flapper valve 142 engages the flapper lever 168 as discussed with respect to FIGS. 7 and 7A. The closing member 176 of the flapper valve 142 defines an aperture 172 which receives a pin 174. The pin 174 is fixed to the shaft 170 of the flapper valve 142. A resilient member (e.g., torsion spring 175 in FIG. 8B) biases the closing member 176 towards a closed position in which the closing member 176 engages a valve seat 178. Once the closing member 176 is in the closed position, the spring 175 provides enough force to cause the closing member 176 to compress seal 178 cutting off the flow of gas. The resilient member 175 rotates the closing member 176 into its closed position.

FIG. 7B illustrates the vent valve 138. The vent valve 138 includes a poppet 180 and stem 186 extending through an aperture 187 defined by the vent valve housing. When the flapper lever 168 is in its open position, engagement between the flapper lever 168 and the poppet 180 and stem 186, lifts the poppet 180 and stem 186 out of engagement with the seat 182. When the flapper lever 168 is in its closed position, a return spring 184 biases the poppet 180 and stem 186 into engagement with a seat 182. During reset operations, this configuration automatically bleeds off actuator pressure from the system to enable easy reset of the system. In particular, referring to FIGS. 7A and 7B, when flapper lever 168 is rotated upwards (opposite direction R2), poppet stem 186 moves upward opening vent valve 138 to vent the fluid in conduit 134 allowing for future reset of the slam shut valve.

In normal operation, a small annular region between the stem 186 and the vent valve housing provides a ring shaped orifice through which minor fluid leakage passes out vent valve 138 preventing the buildup of pressure against the actuator 136 and reducing the likelihood of false trips of the slam shut valve as discussed above. The lever cavity communicates with the atmosphere through an opening 140 in the controller housing (see FIGS. 2 and 3). The ring shaped orifice is small enough that, when valves 130 and 132 open, the flow of fluid is significantly restricted between the controller housing and vent valve stem 186 such that pressure builds in control conduit 134. In response, the actuator assembly 136 and associated mechanical linkage releases the flapper lever 168 to its closed position thus allowing the vent valve to engage seat 182 and prevent leakage of gas from the system.

Figure 9B:
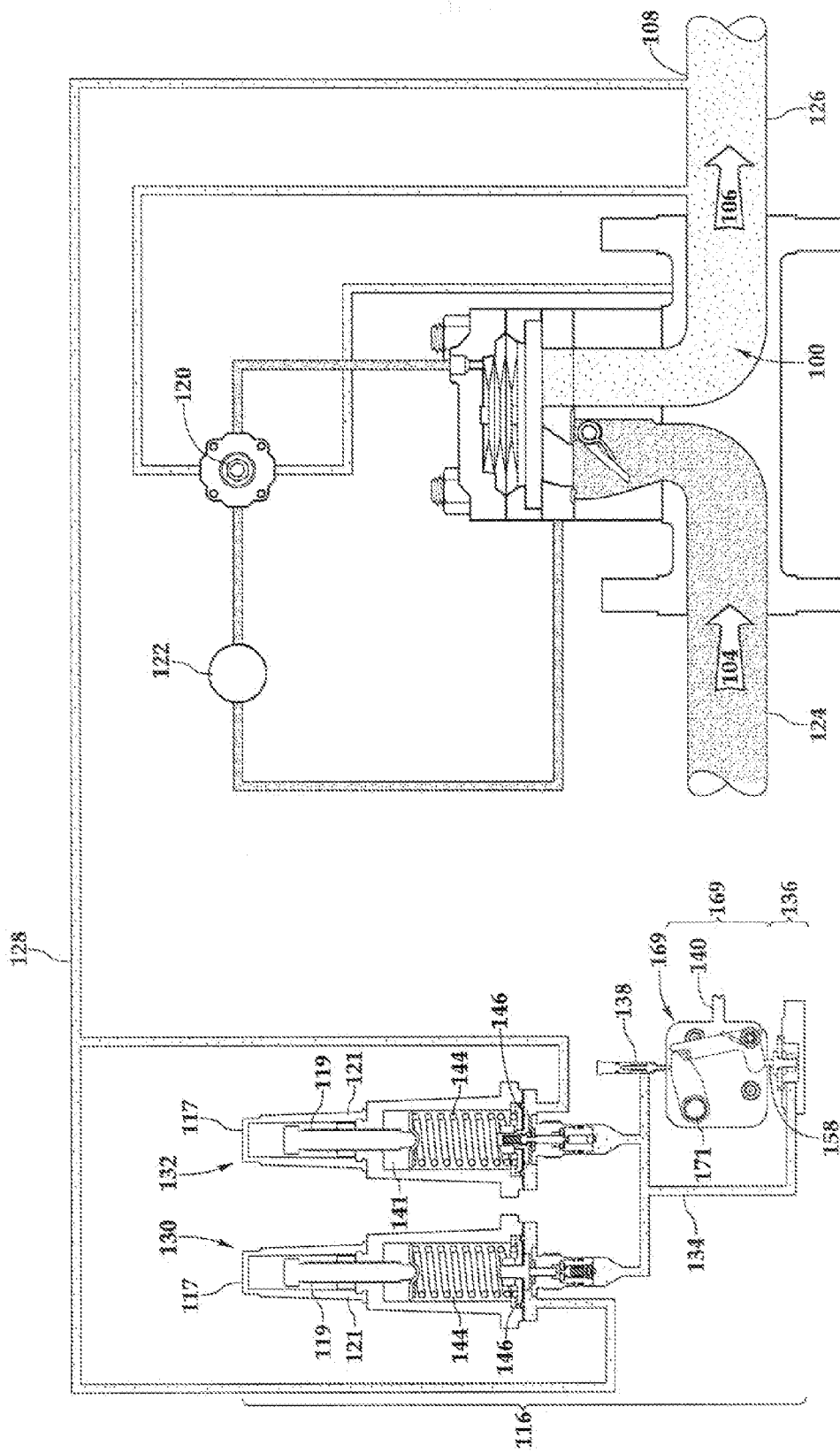
Figure 9C:
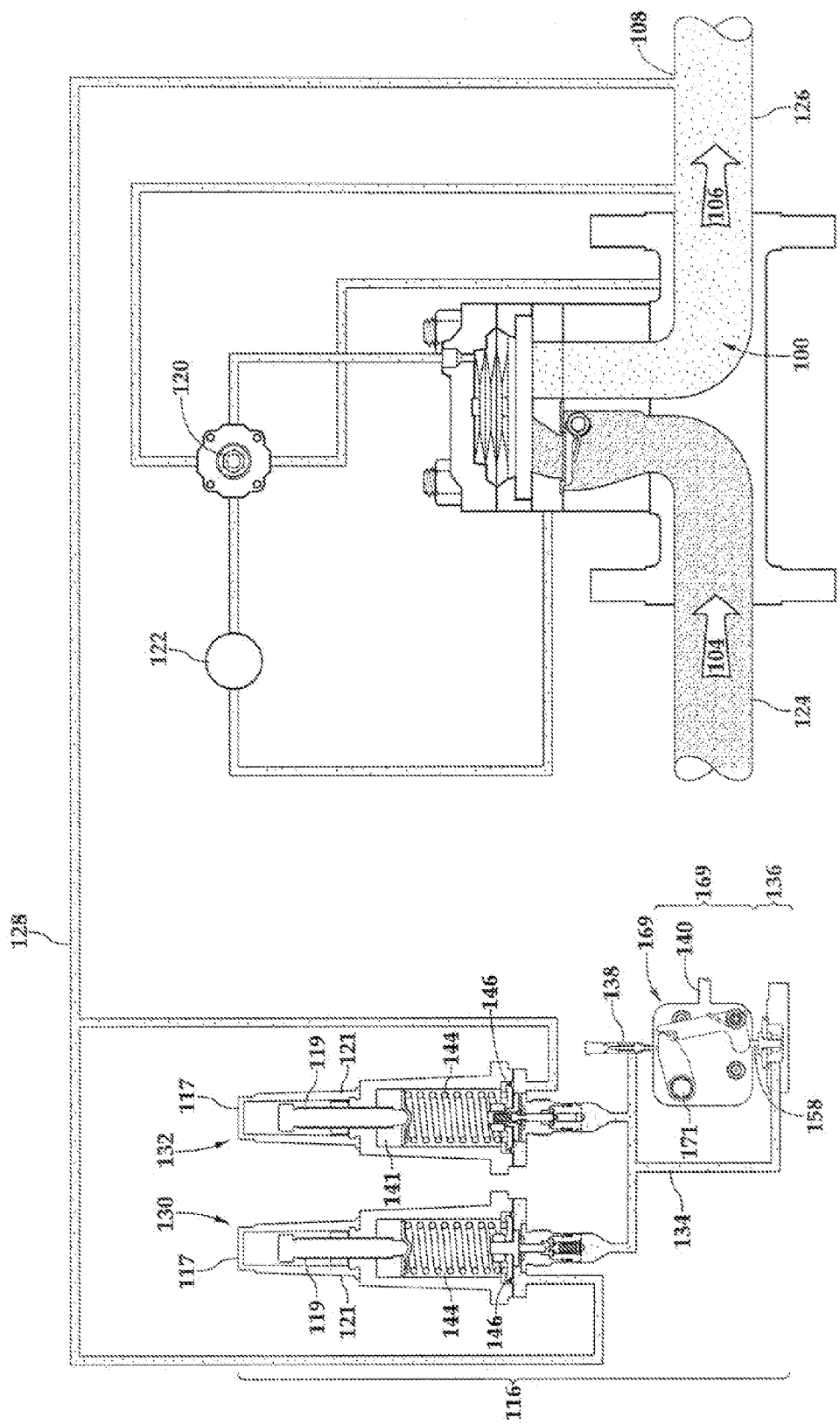

FIGS. 7, 7A, 9A, 9B and 9C illustrate the normal operation of the system. During normal operation, the latch mechanism 169 holds the closure element (flapper) 176 open as shown in FIG. 9A. The sense or downstream pressure is monitored by the diaphragms of high and low trip control valves 130 and 132. The trip valve 146 diaphragms convert the sense pressure into a force proportional to the pressure. The force produced by the trip valve diaphragm 146 is counter balanced by the set point adjustment spring 144 located in the spring case 118. The adjusting rod 119 is used to vary the spring force and control the over-pressure set point or the under-pressure set point as previously described.

When the downstream pressure exceeds the over-pressure set point or is less than the optional under-pressure set point, the trip valve diaphragm and spring move, opening either control valve 130 or 132. The open control valve 130, 132 allows inlet pressure to flow to the actuator diaphragm 156, see FIG. 9B. The pressure acts on the diaphragm 156 which pushes on the pin 158. The pin moves the "L" shaped pawl lever 160 in the direction R1 and releases the flapper lever 168. When the flapper lever 168 is released, a set of springs (e.g., torsion spring 175) pushes the flapper 176 closed against seat 178 and provides the initial force to seal the valve, see FIG. 9C.

To reset the slam shut valve, the pressure is bled from inlet passage 124 and outlet passage 126 through valves in the station. The flapper valve and flapper lever 168 are rotated into the open position by rotating nut 171 counterclockwise in the opposite direction of R2. Contact with flapper lever 168 opens vent valve 138 allowing the pressure acting on diaphragm 156 to escape via the vent valve 138 and vent 140. Latch closing spring 163 (see FIG. 7A) rotates the L-shaped pawl lever 160 so that roller 164 engages with flapper lever 168 and the latch is closed.

A number of embodiments of the invention have been described. Nevertheless, it will be understood that various modifications may be made without departing from the spirit and scope of the invention. Accordingly, other embodiments are within the scope of the following claims.

What is claimed is:

1. A pneumatic controlled slam shut valve system, comprising:
   a slam shut valve having an inlet, an outlet, and an internal closure element disposed there between;
   a mechanical linkage system having a distal end of a pawl lever contacting a flapper lever attached to the internal closure element;
   an actuator assembly including an actuator diaphragm and an actuator pin, said actuator pin contacting a proximal end of the mechanical linkage system, said actuator diaphragm operable to receive a pneumatic pressure signal on a first side and to move the actuator pin connected to the actuator diaphragm;
   at least one trip control valve operable to receive a sensed pressure downstream of the slam shut valve, the at least one trip control valve operable to output a pneumatic pressure signal from a discharge port;
   a conduit system connected to the discharge port of the at least one trip control valve and operable to transmit the pneumatic pressure signal to the first side of the actuator diaphragm; and
   a vent valve connected to the conduit system, said vent valve having a movable pin with a distal end contacting the flapper lever when the internal closure element is in an open position,
   wherein contact between the flapper lever and movable pin holds the vent valve in an open position releasing the pneumatic pressure in the conduit system between the at least one trip control valve and the actuator assembly.

2. The pneumatic controlled slam shut valve system of claim 1, further comprising:
   a reset protrusion disposed on a distal end of a flapper shaft connected to the flapper lever.

3. The pneumatic controlled slam shut valve system of claim 1, wherein the mechanical linkage system further comprises:
   a latch closing spring that biases the pawl lever from an open position to a closed position when the mechanical linkage is actuated by movement of the actuator pin contacting the proximal end of the mechanical linkage system.

4. The pneumatic controlled slam shut valve system of claim 3, wherein the mechanical linkage further includes a roller retained in place by a master link which has a first pin extending through the roller and a second pin extending through the pawl lever, and wherein said master link includes the first and second pins swaged into a top plate and further includes a bottom plate that slides on the pins.

5. The pneumatic controlled slam shut valve system of claim 1, configured such that when the internal closure element is in a closed position, the vent valve is in a closed position holding the pneumatic pressure in the conduit system between the trip control valve and the actuator assembly.

6. The pneumatic controlled slam shut valve system of claim 5, wherein the vent valve comprises a resilient member which biases the vent valve towards a closed position.

7. The pneumatic controlled slam shut valve system of claim 1, wherein the movable pin and the vent valve housing define a small annular region which provides a ring shaped orifice through which minor fluid leakage can pass out the vent valve.

8. The pneumatic controlled slam shut valve system of claim 7, wherein the small annular region of the vent valve is sized such that the flow of fluid between the controller housing and movable pin is less than the flow of fluid through the trip control valve when open.

9. A slam shut valve, comprising:
an internal closure element having a first position and a second position;
a linkage coupled with the internal closure element, the linkage comprising a first lever; and
a vent valve adapted to release pneumatic pressure in a conduit system between a trip control valve and an actuator assembly, the vent valve comprising a movable pin with a distal end that is configured to contact the first lever,
wherein contact between the first lever and the movable pin configures the vent valve in an open position.

10. The slam shut valve of claim 9, wherein the vent valve comprises a housing with an aperture, wherein the movable pin extends through the aperture, and wherein the moveable pin and the aperture form an annular region which provides a ring shaped orifice that is configured to allow fluid leakage out the vent valve in the open position.

11. The slam shut valve of claim 9, wherein the linkage comprises a second lever coupled with the first lever and with the actuator assembly, wherein the actuator assembly comprises a diaphragm, and wherein, in response to movement of the diaphragm, the second lever is configured to rotate to release the first lever and cause the internal closure element to move from the first position to the second position.

12. A method for pneumatic control of a slam shut valve, comprising:
sensing a pressure downstream of a slam shut valve;
transmitting the sensed pressure to a trip control valve;
outputting a pneumatic pressure signal from the trip control valve to the actuator diaphragm of an actuator assembly;
moving an actuator pin connected to a diaphragm of the actuator assembly and moving a proximal end of a mechanical linkage with the actuator pin; and
transmitting movement of the proximal end of the linkage system via the mechanical linkage to a distal end of the mechanical linkage thereby: initiating movement of a closure element of the slam shut valve from an open valve position to a closed valve position
wherein transmitting movement of the proximal end of the linkage system via the mechanical linkage to a distal end of the mechanical linkage further includes releasing a poppet in a vent valve to move to its closed position.

13. The method of claim 12, wherein movement of the closure element of the slant shut valve from an open valve position to a closed valve position comprises rotation of the closure element about the axis of a shaft.

14. The method of claim 12, comprising, when the closure member is open, releasing a pressure fluid through the vent valve from a conduit extending between the trip control valve to the actuator diaphragm.

15. A method for resetting a pneumatic controlled slam shut valve comprising:
rotating a flapper shaft:
to move an internal closure element of a slam shut valve from a shut position to an open position; and
to move a flapper attached to the flapper shaft into contact with the movable pin of a vent valve connected to a conduit system between a trip control valve and an actuator assembly;
opening the vent valve through contact of the flapper attached to the flapper shaft into contact with the movable pin; and
releasing pressure from the conduit system between the trip control valve and the actuator assembly.

16. The method of claim 15, wherein releasing pressure from the conduit system between the trip control valve and a valve controller moves a diaphragm and actuator pin of the actuator assembly.

17. The method of claim 16, wherein releasing pneumatic pressure in the conduit system comprises equalizing pneumatic pressure on opposite sides of the diaphragm of the actuator assembly.

18. The method of claim 17, wherein equalizing pneumatic pressure on opposite sides of the diaphragm of the valve controller allows a resilient member to move a mechanical linkage member into contact with the flapper lever.

* * * * *